(12) United States Patent
Kosht et al.

(10) Patent No.: US 7,513,170 B2
(45) Date of Patent: Apr. 7, 2009

(54) MAGNETIC SHEAR FORCE SENSOR

(75) Inventors: Danial L. Kosht, Gaylord, MI (US);
Larry J. Terpstra, Central Lake, MI (US); Joseph M. Walling, Boyne City, MI (US)

(73) Assignee: Honeywell International Inc., Morristown, NJ (US)

( * ) Notice: Subject to any disclaimer, the term of this patent is extended or adjusted under 35 U.S.C. 154(b) by 50 days.

(21) Appl. No.: 11/853,199

(22) Filed: Sep. 11, 2007

(65) Prior Publication Data

US 2009/0064799 A1   Mar. 12, 2009

(51) Int. Cl.
*G01L 1/00* (2006.01)
*G01L 1/12* (2006.01)
*H01F 21/06* (2006.01)

(52) U.S. Cl. .............. 73/862.642; 73/862.626; 73/862.69; 336/20

(58) Field of Classification Search ............ 73/862.321, 73/862.325, 862.331, 862.332, 862.381, 73/862.451, 862.473, 862.392, 841; 336/115–136, 336/20
See application file for complete search history.

(56) References Cited

U.S. PATENT DOCUMENTS

| | | | |
|---|---|---|---|
| 2,737,049 A * | 3/1956 | Waugh ................ | 73/862.322 |
| 3,882,436 A | 5/1975 | Chass | |
| 4,347,491 A | 8/1982 | Chass | |
| 4,551,699 A | 11/1985 | de Jong et al. | |
| 5,009,110 A * | 4/1991 | Lang et al. ............. | 73/862.322 |
| 5,115,685 A * | 5/1992 | Jorgensen et al. ...... | 73/862.331 |
| 6,273,211 B1 * | 8/2001 | Engels et al. ............... | 180/446 |
| 6,309,106 B1 * | 10/2001 | Hooley ......................... | 384/7 |

* cited by examiner

*Primary Examiner*—Harshad Patel
*Assistant Examiner*—Jonathan Dunlap
(74) *Attorney, Agent, or Firm*—Ingrassia Fisher & Lorenz, PC

(57) ABSTRACT

A shear sensor includes a stator structure, a transformer, and a ferromagnetic core. The stator structure distorts in two perpendicular axes upon application thereto of a shear force. The transformer is coupled to the stator structure, and includes a primary winding and a pair of differentially wound secondary windings. The ferromagnetic core is non-rotationally coupled to the stator structure and is at least partially surrounded by the primary and secondary windings. The core is spaced apart from the transformer stator poles to define an air gap between the core and the stator poles. The air gap varies in the two perpendicular axes upon application of the shear force to the stator structure.

20 Claims, 6 Drawing Sheets

US 7,513,170 B2

MAGNETIC SHEAR FORCE SENSOR

TECHNICAL FIELD

The present invention generally relates to a shear force sensor and, more particularly, to a magnetic shear force sensor that senses an applied shear force by measuring magnetic air gap variations.

BACKGROUND

Various devices and methods are available for sensing shear forces may be applied to a structure. In many instances, strain gages, such as metal foil strain gages, are used to sense applied shear forces. More specifically, these metal foil strain gages may be adhered on specific areas of the structure to which shear forces may be applied. While this device is generally safe, reliable, and robust, it can suffer certain drawbacks. For example, it may be desirable, in some instances, to adhere the strain gages down blind holes of a structure. In doing so, however, it can be quite difficult to attain proper gage-to-gage alignment. Additionally, it is generally known that strain gage sensors typically exhibit drift/creep issues over time, may be susceptible to electromagnetic interference (EMI), and may perform poorly over wide temperature ranges.

Hence, there is a need for a device and method of sensing shear forces applied to a structure that may readily be disposed within a structure and/or exhibits relatively low drift/creep over time and/or exhibits relatively low EMI susceptibility and/or exhibits relatively good performance over wide temperature ranges. The present invention addresses one or more of these needs.

BRIEF SUMMARY

In one embodiment, and by way of example only, a shear sensor includes a stator structure, a transformer, and a ferromagnetic core. The stator structure is adapted to distort in two perpendicular axes upon application thereto of a shear force. The transformer is at least partially coupled to the stator structure, and includes a primary winding and a pair of differentially wound secondary windings. At least the primary winding is configured to define at least two stator poles. The ferromagnetic core is non-rotationally coupled to the stator structure and is at least partially surrounded by the primary and secondary windings. The core is spaced apart from the stator poles to define an air gap between the core and the stator poles. The air gap varies in the two perpendicular axes upon application of the shear force to the stator structure.

In yet another exemplary embodiment, a shear force sensing system includes an alternating current (AC) excitation signal source, a stator structure, a signal processing circuit, and a transformer. The AC excitation signal source is coupled to the primary winding and is operable to supply an AC excitation signal. The stator structure is adapted to distort in two perpendicular axes upon application thereto of a shear force. The signal processing circuit is coupled to receive an AC output signal and is operable, upon receipt of the AC output signal, to determine a magnitude of the shear force applied to the stator structure and to supply a signal representative of the determined shear force magnitude. The transformer is at least partially coupled to the stator structure and includes a primary winding, a pair of secondary windings, and a ferromagnetic core. At least the primary winding is configured to define at least two stator poles. The primary winding is coupled to receive the AC excitation signal. The secondary windings are differentially wound and are series-coupled. The ferromagnetic core is non-rotationally coupled to the stator structure and is at least partially surrounded by the primary and secondary windings. The core is spaced apart from the stator poles to define an air gap between the core and the stator poles. The air gap varies in the two perpendicular axes upon application of the shear force to the stator structure. The transformer secondary windings supply the AC output signal at a magnitude representative of variations in the air gap in the two perpendicular axes.

In still another exemplary embodiment, a method of determining a magnitude of a shear force using a rotary variable differential transformer (RVDT) that includes a stator structure having a transformer coupled thereto that includes at least two stator poles, a primary winding, a pair of differentially wound secondary windings, and a ferromagnetic core at least partially surrounded by the primary and secondary windings and spaced apart from the stator poles to define an air gap between the ferromagnetic core and the stator poles, includes the steps of fixing the ferromagnetic core against rotation, applying a shear force to the stator structure, and determining the magnitude of the shear force based on variations in the air gap in response to the applied shear force.

Other desirable features and characteristics of the exemplary shear force sensor, sensing system, and sensing method will become apparent from the subsequent detailed description and the appended claims, taken in conjunction with the accompanying drawings and the background.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
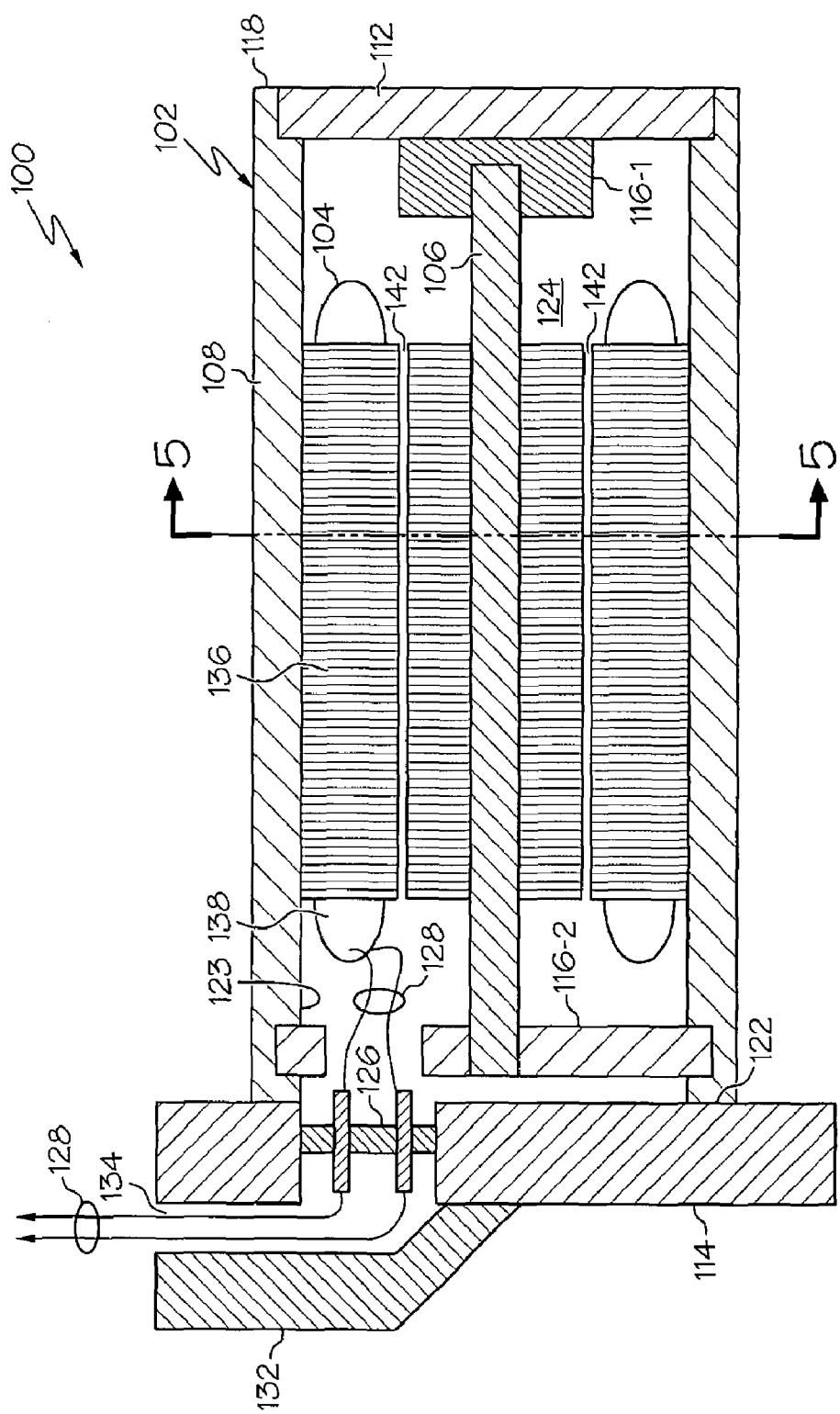
FIG. 1 is a simplified cross section view of an exemplary magnetic shear sensor according to one embodiment of the present invention.

Turning to FIG. 1, a simplified cross section view of an exemplary embodiment of a magnetic shear sensor 100 is depicted and includes a stator structure 102, a transformer 104, and a core 106. The stator structure 102 includes a housing 108, a base 112, an end cap 114, and core supports 116 (e.g., 116-1, 116-2). Moreover, as will be described in more detail further below, at least a portion of the stator structure 102 is adapted to distort in two perpendicular axes upon application thereto of a shear force. The housing 108 has a first end 118 and a second end 122, and includes an inner surface 123 that defines cavity 124. The transformer 104, which is described in more detail further below, is disposed within the cavity 124 and is coupled to the housing 108. The base 112 is coupled to the housing first end 118, and the end cap 114 is coupled to the housing second end 122. Preferably, the base 112 and the end cap 114 enclose, or at least substantially enclose, the housing cavity 124.

As FIG. 1 further depicts, the end cap 114 may include an electrical interface 126, such as a glass header assembly, that is used to electrically couple the transformer 104 to external electrical equipment or devices. It will be appreciated that the electrical interface 126 may be formed as an integral part of the end cap 114, or may be separately coupled to the end cap 114. In either case, electrical conductors 128 are preferably coupled between the electrical interface 126 and the transformer 104, and between the electrical interface 126 and non-illustrated external electrical equipment or devices. The end cap 114, at least in the depicted embodiment, includes a conductor guide 132 that forms a channel 134 through which the electrical conductors 128 that are coupled to the external electrical equipment or devices may readily extend. Similar to the electrical interface 126, it will be appreciated that the conductor guide 132 may be formed as an integral part of the end cap 114, or may be separately coupled to the end cap 114.

The core supports 116 are disposed within the housing cavity 124 and are used to support the core 106. One of the core supports 116-1 is coupled to the base 112 and the other core support 116-2 is coupled to the housing 108. Preferably, the core supports 116 are configured to mount the core 106 against rotation, or at least selectively mount the core 106 against rotation. More specifically, in some embodiments the core supports 116 are configured to fixedly, and non-adjustably, mount the core 106 against rotation. In other embodiments, however, the core supports 116 are configured to allow the core 106 to be adjustably rotated to a desired position, and then fixedly mounted against rotation 106 in the desired position.

The transformer 104, as was noted above, is coupled to the stator structure 102, and more specifically to the housing inner surface 123, and includes a stator stack 136 and a plurality of windings 138. Similar to the stator structure 102, the stator stack 136 is adapted to distort in two perpendicular axes upon application of a shear force to the stator structure 102. The stator stack 136 may be variously implemented, but is preferably formed of a stack of thin laminations of permeable material. The specific permeable material may vary, and may be selected from any one of numerous permeable materials now known or developed in the future.

Figure 2:
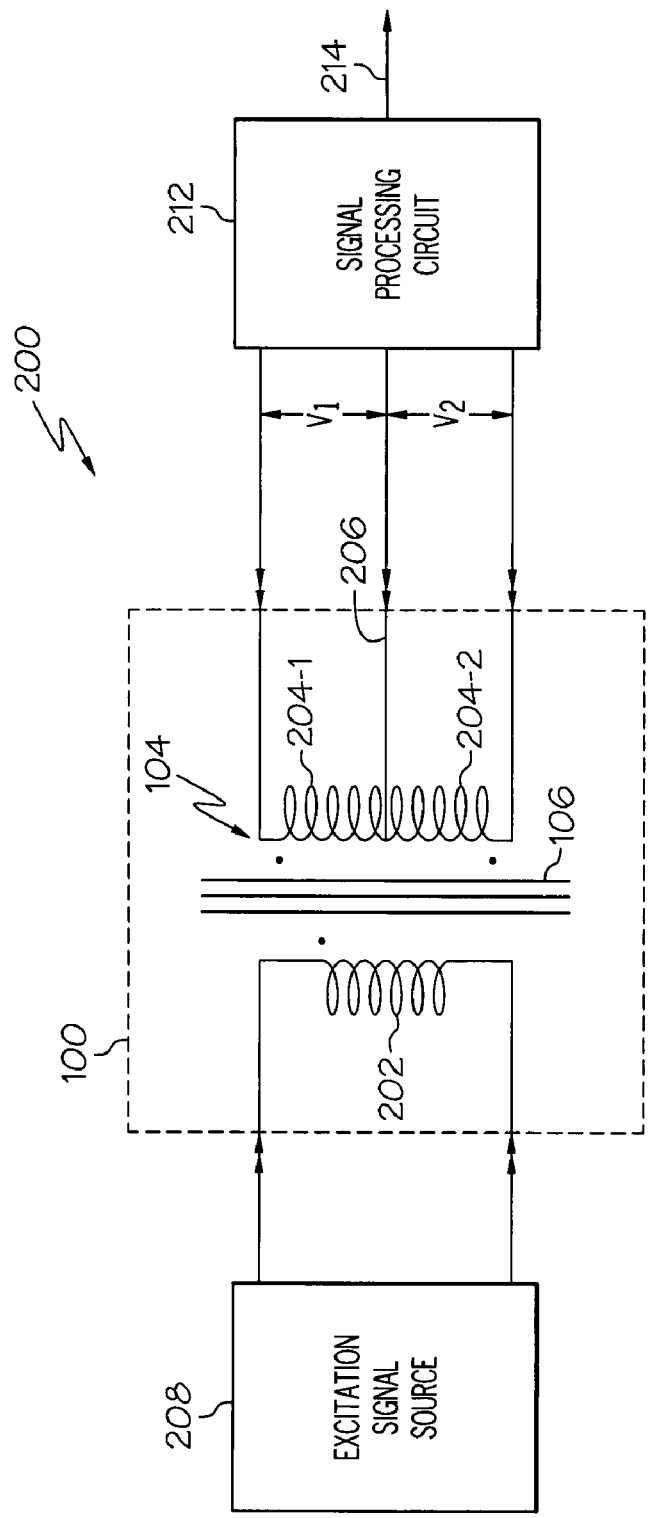
FIG. 2 is a schematic representation of a shear force sensing system, depicting the exemplary sensor of FIG. 1 coupled to input and output circuitry.
Figure 3:
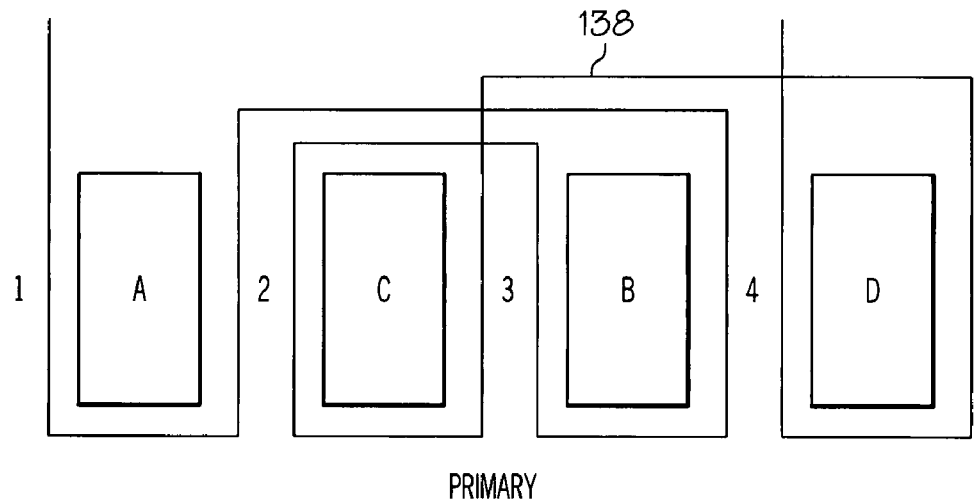
FIG. 3 is a simplified representation of the manner in which primary windings of the exemplary sensor of FIG. 1 may be electrically wound on a stator structure.
Figure 4:
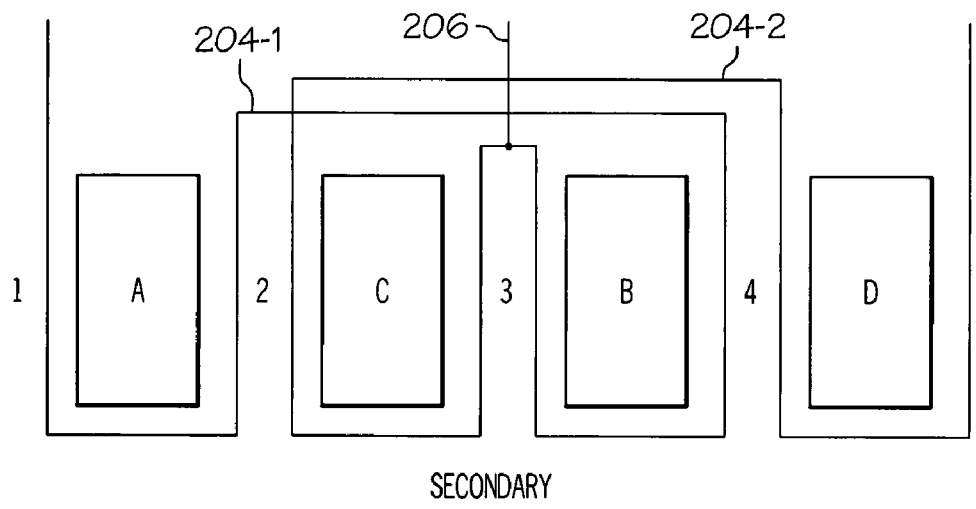
FIG. 4 is a simplified representation of the manner in which secondary windings of the exemplary sensor of FIG. 1 may be electrically wound on the stator structure.

As is shown most clearly in FIG. 2, the plurality of windings 138 preferably include a primary winding 202 and a pair of differentially wound secondary windings 204 (e.g., 204-1, 204-2). The primary winding 202 and the secondary windings 204 may both be wound on the stator stack 136. Alternatively, the primary winding 202 may be wound on the stator stack 136 and the secondary may be wound on the core 106. In either case, and as FIG. 2 also shows, the secondary windings 204, at least in the depicted embodiment, are electrically coupled in series with each other, and share a common node 206. It will be appreciated that this is merely exemplary of a particular embodiment, and that the secondary windings 204 could be electrically isolated from one another, so long as the secondary windings 204 are differentially wound with respect to each other. It will additionally be appreciated that the transformer 104 may be variously wound, and may be configured to implement any one of a number of two or more poles (e.g., 2, 3, 4, . . . N-number of poles). In one particular embodiment, the transformer 104 is configured to implement a 4-pole transformer. For completeness, exemplary manners in which the primary winding 202 and the secondary windings 204 may be wound on the stator stack 136 to implement a 4-pole transformer are depicted in FIGS. 3 and 4, respectively.

Returning once again to FIG. 1, it is seen that the core 106 is disposed within the housing cavity 124, and is non-rotationally coupled to the stator structure 102. In the depicted embodiment, and as was mentioned previously, the core 106 is either fixedly, and non-adjustably, coupled to the stator structure 102 via the core mounts 116, or is fixedly mounted against rotation by the core supports 116 after being adjustably rotated to a desired position. In either case, the core 106 is preferably constructed of a ferromagnetic material and is surrounded, or at least partially surrounded, by the windings 138. The core 106 is additionally spaced apart from the stator stack 136 and as such defines an air gap 142, in two dimensions, between the core 106 and the stator stack 136. It will thus be appreciated that the air gap 142 also varies in the two perpendicular axes upon application of the shear force to the stator structure.

Figure 5A:
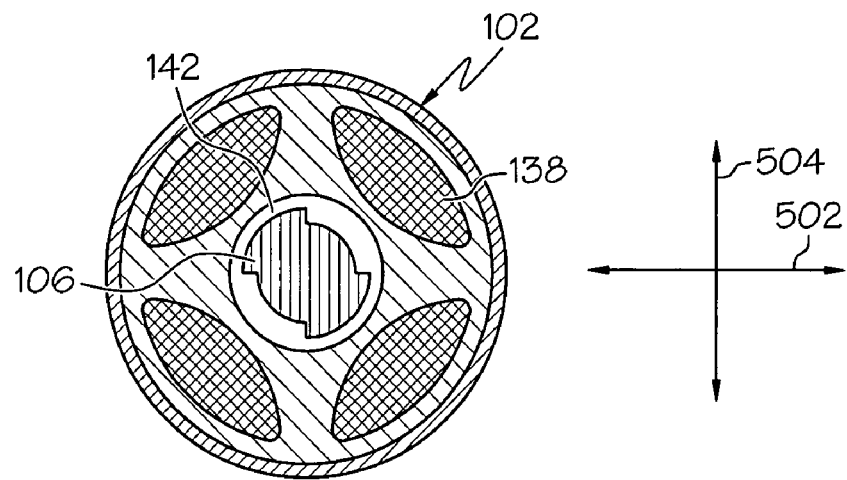
FIGS. 5A and 5B depict simplified cross section views of the sensor, taken along line 5-5 in FIG. 1, with no shear force being applied to the sensor and with a shear force being applied to the sensor, respectively.
Figure 5B:
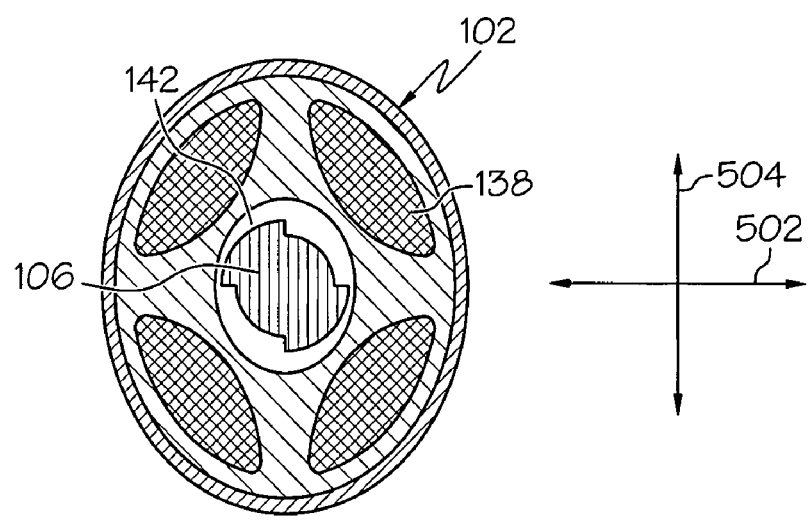

It was previously mentioned that the stator structure 102, which includes the housing 108 and the stator stack 136, distorts in two perpendicular axes upon application of a shear force to the stator structure 102. It was additionally mentioned that the air gap 142 concomitantly varies in the two perpendicular axes upon application of a shear force to the stator structure 102. With reference now to FIGS. 5A and 5B, this phenomenon is depicted more clearly. In particular, FIG. 5A depicts a simplified cross section view of the sensor 100 taken along line 5-5 in FIG. 1 with no shear force being applied to the stator structure 102. The stator structure 102, at least in the depicted embodiment, has a round cross section, or at least a substantially round cross section, when no shear force is applied thereto. As such, the air gap 142 is equal, or at least substantially equal, in the two perpendicular axes 502, 504. Conversely, and as depicted in FIG. 5A, when a shear force is applied to the stator structure 102, the depicted stator structure 102 locally deforms to have an out-of-round, or at least substantially out-of-round, cross section. Thus, as was just mentioned, upon application of the shear force the air gap 142 varies in the two perpendicular axes 502, 504. As will now be explained, this variation in the air gap 142 is used to sense the magnitude of the applied shear force.

It is generally known that when the primary windings 202 of a transformer, such as the transformer 104 described herein, are supplied with an alternating current (AC) excitation signal, AC voltages are induced in each of the secondary windings 204. It is additionally known that these induced voltages vary as a function of the air gap 142, if other variables, such as the geometry and angle or the core 106, are held fixed. Because, as was just noted, the air gap 142 varies in the two perpendicular axes 502, 504 upon application of a shear force to the stator structure 102, the voltages induced in the secondary windings 204 vary as a function of the applied shear force, and can thus be used to determine the magnitude of the applied shear force. An exemplary system configuration for determining the magnitude of an applied shear force to the sensor will now be described.

Returning once again to FIG. 2, an embodiment of a shear sensor system 200, which includes the above-described shear sensor 100, is depicted. The system includes the previously-described shear sensor 100, and further includes an excitation signal source 208 and a signal processing circuit. The excitation signal source 208 is electrically coupled to, and is operable to supply an AC excitation signal to, the transformer primary winding 202. The secondary windings 204, upon receipt of the AC excitation signal by the primary windings 202, supply an AC output signal to the signal processing circuit 212. More specifically, voltages ($V_1$, $V_2$) are induced in the secondary windings 204 that, as noted above, vary as a function of the air gap 142. In any case, the signal processing circuit 212 is operable, upon receipt of the AC output signal, to determine the magnitude of the shear force applied to the stator structure 102 and to supply a signal 214 representative of the determined shear force magnitude. The output signal 214 may be used to drive a display or other suitable device, or may be supplied to other signal processing circuitry and/or control circuitry, as needed or desired.

The sensor 100 described herein may be configured similar to a rotary variable differential transformer (RVDT) sensor. Indeed, in one particular embodiment the sensor 100 is implemented using a conventional RVDT, but with the RVDT rotor (or core) mounted against rotation. As is generally known, the output of an RVDT, upon electrical excitation thereof, varies from a zero (or null) output to a maximum magnitude output as a function of the relative rotational position of the core. As was alluded to above, it may thus be appreciated that the sensor 100 may be configured such that the core 106, while being mounted against rotation, may also be disposed in any one of numerous relative rotational positions. The relative rotational position may correspond to the just-mentioned null position, or may be any one of numerous other relative rotational positions.

Figure 6A:
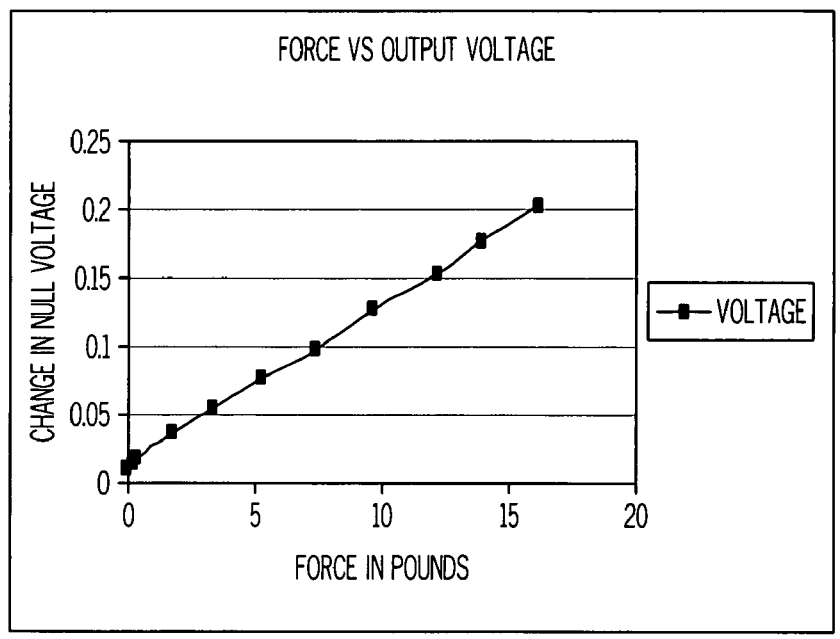
FIGS. 6A and 6B are graphs of test data for an exemplary sensor having its core mounted against rotation at a null position, showing variations in output voltage with variations in applied load, and variations in output voltage with variations in stator structure deflection, respectively.
Figure 6B:
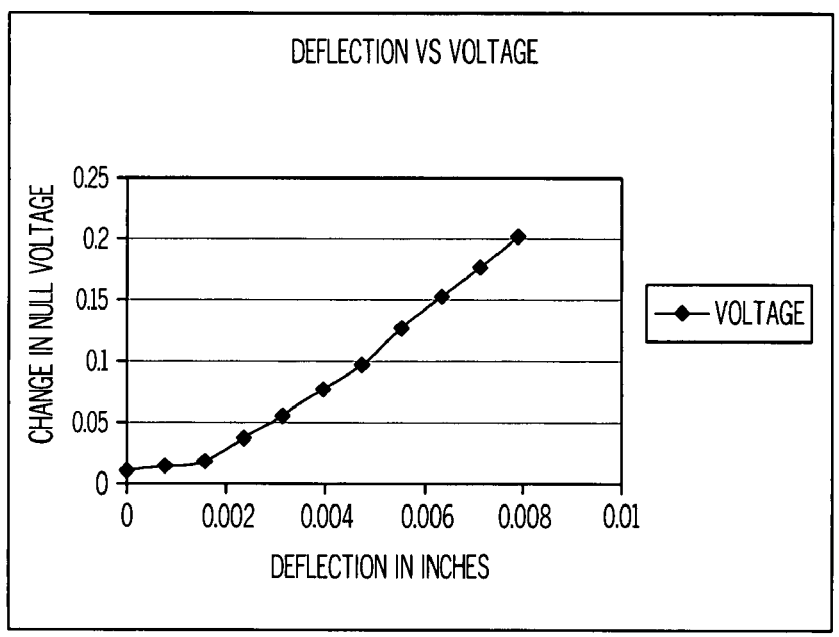
Figure 7A:
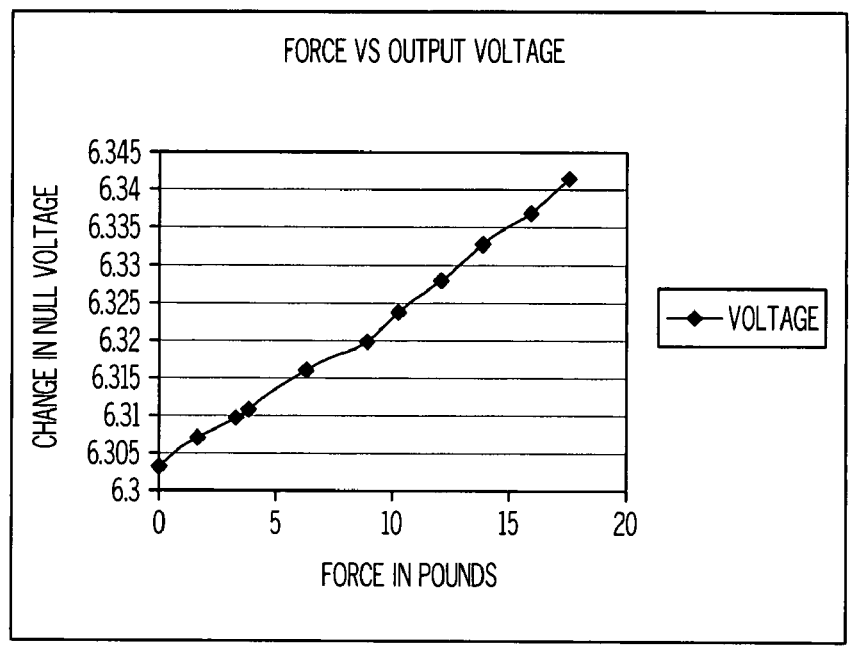
FIGS. 7A and 7B are graphs of test data for an exemplary sensor having its core mounted against rotation at a maximum output position, showing variations in output voltage with variations in applied load, and variations in output voltage with variations in stator structure deflection, respectively.
Figure 7B:
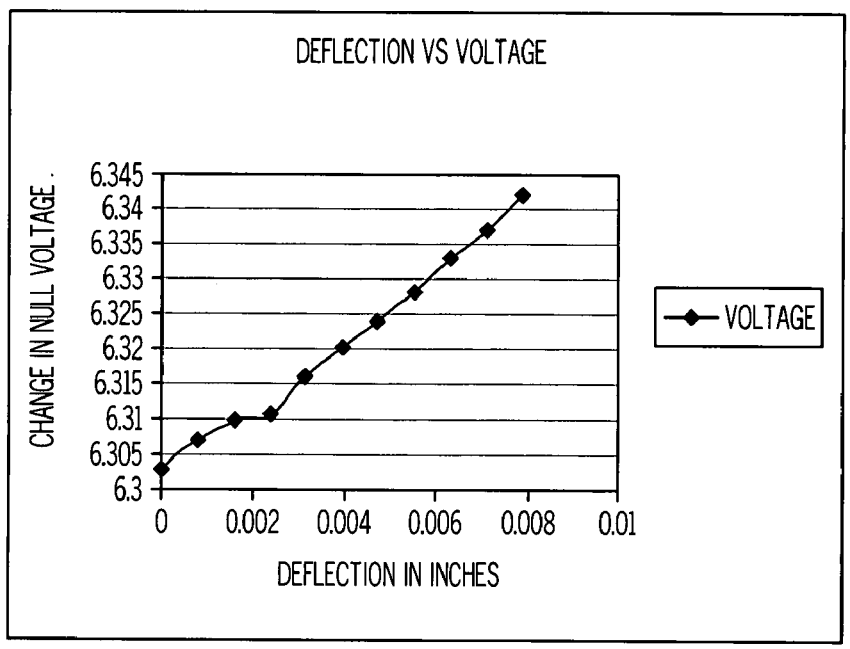

It is noted that tests were run on a sensor 100 with the core 106 mounted against rotation at the null position, and with the core mounted against rotation at a maximum output position. These tests included applying a varying side load (or squeeze load) on the stator structure 102 and measuring the variations in the output voltage. The test results for the sensor with the core 106 mounted against rotation at the null position are depicted graphically in FIGS. 6A and 6B, and the test results for the sensor with the core 106 mounted against rotation at the maximum output position are depicted graphically in FIGS. 7A and 7B. The graphs in FIGS. 6A and 7A depict the associated variations in output voltage with the variations in applied load, and the graphs in FIGS. 6B and 7B depict the associated variations in output voltage with the variations in stator structure deflection. An analysis of these data indicate that the sensor 100 is more sensitive with the core 106 mounted against rotation at the null position.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A shear sensor, comprising:
   a stator structure adapted to distort in two perpendicular axes upon application of a shear force to the stator structure;
   a transformer at least partially coupled to the stator structure, the transformer including a primary winding and a pair of differentially wound secondary windings, at least the primary winding wound to define at least two stator poles; and
   a ferromagnetic core non-rotationally coupled to the stator structure and at least partially surrounded by the primary and secondary windings, the core spaced apart from the stator poles to define an air gap between the core and the stator poles;
   wherein the air gap varies in the two perpendicular axes upon application of the shear force to the stator structure.

2. The sensor of claim 1, wherein:
   the ferromagnetic core, when rotatable relative to the stator structure, is rotatable from a null position to a maximum rotational position;
   the transformer secondary windings supply an alternating current (AC) output signal upon the primary winding being energized with an AC excitation signal;
   the AC output signal varies from a null magnitude, when the ferromagnetic core is in the null position, to a maximum output magnitude, when the ferromagnetic core is in the maximum rotational position; and
   the ferromagnetic core is non-rotationally coupled to stator structure in the null position.

3. The sensor of claim 1, wherein:
   the transformer is configured as a 4-pole transformer; and
   the primary winding is series-wound on the stator structure.

4. The sensor of claim 3, wherein the secondary windings are electrically coupled in series.

5. The sensor of claim 3, wherein the rotor is configured as a 2-pole rotor.

6. The sensor of claim 1, wherein:
   the stator structure has at least a substantially round cross section when a shear force is not applied to the stator structure; and
   the stator structure is configured to deform to a substantially out-of-round cross section when a shear force is applied to the stator structure.

7. The sensor of claim 1, further comprising:
   an alternating current (AC) excitation signal source coupled to the primary winding and operable to supply an AC excitation signal to the primary winding,
   wherein the transformer secondary windings supply an AC output signal having a magnitude representative of variations in the air gap in the two perpendicular axes.

8. The sensor of claim 7, further comprising:
   a signal processing circuit coupled to receive the AC output signal from the secondary windings, the signal processing circuit operable to determine a magnitude of the shear force applied to the stator structure and supply a signal representative of the determined shear force magnitude.

9. The sensor of claim 1, wherein:
   the primary winding is series-wound; and
   the transformer is configured as a 3-pole transformer.

10. The sensor of claim 1, wherein the secondary windings are disposed on the core.

11. A shear force sensing system, comprising:
an alternating current (AC) excitation signal source coupled to the primary winding and operable to supply an AC excitation signal;
a stator structure adapted to distort in two perpendicular axes upon application of a shear force to the stator structure;
a signal processing circuit coupled to receive an AC output signal and operable, upon receipt of the AC output signal, to (i) determine a magnitude of the shear force applied to the stator structure and (ii) supply a signal representative of the determined shear force magnitude; and
a transformer at least partially coupled to the stator structure, the transformer including:
  a primary winding coupled to receive the AC excitation signal and configured to define at least two stator poles,
  a pair of differentially wound, series-coupled secondary windings, and
  a ferromagnetic core non-rotationally coupled to the stator structure and at least partially surrounded by the primary and secondary windings, the core spaced apart from the stator poles to define an air gap between the core and the stator poles, the air gap varying in the two perpendicular axes upon application of the shear force to the stator structure,
wherein the transformer secondary windings supply the AC output signal at a magnitude representative of variations in the air gap in the two perpendicular axes.

12. The system of claim 11, wherein:
the ferromagnetic core, when rotatable relative to the stator structure, is rotatable from a null position to a maximum rotational position;
the AC output signal supplied from the secondary winding varies from a null magnitude, when the ferromagnetic core is in the null position, to a maximum output magnitude, when the ferromagnetic core is in the maximum rotational position; and
the ferromagnetic core is non-rotationally coupled to stator structure in the null position.

13. The system of claim 11, wherein:
the transformer is a 4-pole transformer; and
the primary winding is series-wound on the stator structure.

14. The system of claim 13, wherein the rotor is configured as a 2-pole rotor.

15. The system of claim 11, wherein:
the stator structure has at least a substantially round cross section when a shear force is not applied to the stator structure; and
the stator structure is configured to deform to a substantially out-of-round cross section when a shear force is applied to the stator structure.

16. The system of claim 11, wherein:
the primary winding is series-wound; and
the transformer is configured as a 3-pole transformer.

17. The system of claim 11, wherein the secondary windings are disposed on the core.

18. A method of determining a magnitude of a shear force using a rotary variable differential transformer (RVDT), the RVDT including a stator structure having a transformer coupled thereto, the transforming comprising a primary winding, a pair of differentially wound secondary windings, and a ferromagnetic core at least partially surrounded by, and spaced apart from, the primary and secondary windings to define an air gap between the ferromagnetic core and the primary and secondary windings, the method comprising the steps of:
fixing the ferromagnetic core against rotation;
applying a shear force to the stator structure; and
determining the magnitude of the shear force based on variations in the air gap in response to the applied shear force.

19. The method of claim 18, further comprising:
supplying an alternating current (AC) excitation signal to the primary winding;
measuring an AC output signal supplied by the secondary windings; and
determining the magnitude of the shear force from the measured AC output signal.

20. The method of claim 18, further comprising fixing the ferromagnetic core against rotation in a null position,
wherein:
  the ferromagnetic core, if configured to rotate relative to the stator structure, is rotatable from the null position to a maximum rotational position, and
  the AC output signal supplied from the secondary windings varies from a null magnitude, when the ferromagnetic core is in the null position, to a maximum output magnitude, when the ferromagnetic core is in the maximum rotational position.

* * * * *